May 27, 1941.  B. M. CAIN  2,243,070

CAPACITOR MOTOR

Filed April 16, 1940

Inventor:
Bernard M. Cain,
by Harry E. Dunham
His Attorney.

Patented May 27, 1941

2,243,070

UNITED STATES PATENT OFFICE 2,243,070

CAPACITOR MOTOR

Bernard M. Cain, Marblehead, Mass., assignor to General Electric Company, a corporation of New York Application April 16, 1940, Serial No. 329,876

4 Claims. (Cl. 172—233)

My invention relates to dual voltage, single phase capacitor motors in which capacity is employed in the starting winding circuit to obtain high torque split phase starting and a reduced amount of capacity is employed in this circuit to obtain high power factor running conditions. The invention contemplates the use of electrolytic capacity during the short starting period only and an important object of the invention is to obtain increased effectiveness in the use of the running condenser at all times.

In carrying my invention into effect, the main winding of the motor is made in three sections, one section being preferably made of smaller wire than the other two sections and employed as an extended or auto transformer winding in series with the running condenser to obtain a high voltage on the running condenser which voltage is not changed by reason of operating the motor from 110 volt or 220 volt sources, for example. I prefer, also, to so arrange matters that the number of turns in the three winding sections is the same, to the end that the three conductors for these windings may be wound as a group at the same time, thereby reducing costs.

I also may, to advantage, make the starting winding in two equal turn sections and connect the starting condenser through one section and the running condenser through both sections in series.

Figure 1:
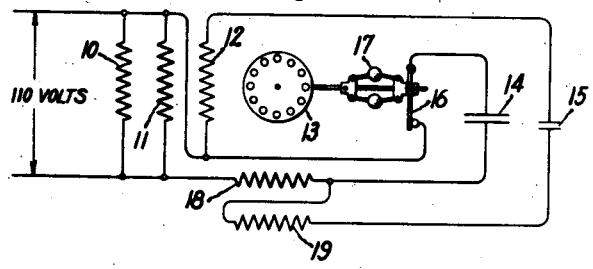
Figure 2:
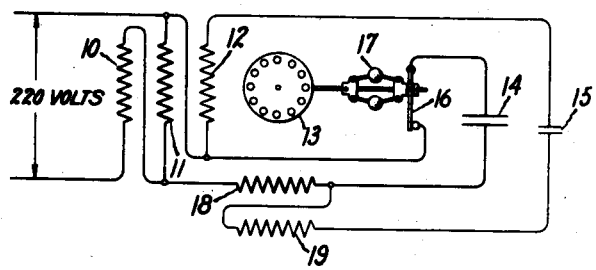
Figure 3:
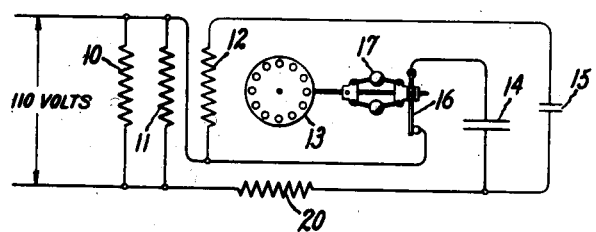
Figure 4:
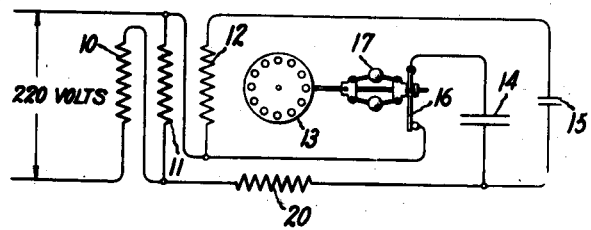

The features of my invention which are believed to be novel and patentable will be pointed out in the claims appended hereto. For a better understanding of my invention, reference is made in the following description to the accompanying drawing, in which Fig. 1 represents a motor embodying my invention connected for one line voltage, and Fig. 2 represents the same motor connected for double such line voltage. In Figs. 1 and 2 the motor has a three-section main winding and a double section start winding. Figs. 3 and 4 represent different line voltage connections for a motor like that of Figs. 1 and 2, except that the starting winding has only one section.

Referring now to the drawing in which like parts are represented by like reference characters, 10, 11 and 12 represent the three coils of the main winding. These coils preferably have the same number of turns so that their conductors may be wound on together just as if they comprised a single cable. This reduces the cost of manufacture. The conductors used in coils 10 and 11 are of the same size and preferably slightly more than double the size of the conductor used for the main winding section 12. Winding 12 is permanently connected as an auto-transformer extension to coil 11 for increasing the voltage on the running condenser circuit, and can to advantage be made of smaller wire than the similar main winding coils 10 and 11. For the lower line voltage, coils 10 and 11 are connected in parallel as in Figs. 1 and 3, and for double this line voltage, these coils are connected in series as in Figs. 2 and 4. It will be noted that for either line voltage connection the coils 11 and 12 are used together as a step-up auto-transformer and that the voltages at the terminals of such transformer are the same for either line connection. If the voltage across coil 11 is 110 volts, that across both coils 11 and 12 is 220 volts, since their number of turns are the same. Likewise, the voltage across all main winding coils is the same for either line voltage, since in Figs. 1 and 3 the coils 10 and 11 are connected in parallel to the line and in Figs. 2 and 4 they are connected in series to the line.

In all of the figures the secondary rotor 13 is represented as of the squirrel cage type. 14 is the starting condenser preferably of the electrolytic type and 15 is the running condenser of the electrostatic type. In all cases some form of automatic switch 16 is provided in series with the starting condenser 14 to open its circuit as the motor comes up to speed. A switch operating device 17 of the centrifugal type is represented but any other suitable types may be used. The switch 16 is shown closed as for starting in all figures.

In Figs. 1 and 2 the starting winding is represented by the two equal turn coils 18 and 19. Coil 18 which carries the current of both condenser circuits is of heavier wire than coil 19 which carries the current of only the running condenser. Hence these coils may be wound at the same time, using conductors of the proper size. Coil 19 will use the same size of wire as coil 12, since they are both running windings and are connected in series. The coil 18 will preferably use a conductor slightly less than double the size of that in coil 19. While the maximum current carried by coil 18 will be more than double that in coil 19, coil 18 will only carry a heavy current during the short starting period and when switch 16 opens, the current therein will be greatly reduced and thereafter it will carry only the current in the running condenser circuit.

It is seen that the starting condenser 14 is connected in series with switch 16 and coil 18 across the main winding coil portion 11 of the auto-transformer for both high and low voltage line connections and hence this circuit is subjected to the same voltage for both connections during the short starting period and the condenser 14 as well as coil 18 may be economically designed for identical short time duty cycles for both line voltage connections of the motor. The running condenser circuit formed by condenser 15 and coils 19 and 18 in series is connected across the full voltage of main coil 11 and the extension coil 12 as an auto-transformer, and this voltage is the same for either line voltage connection and is that of the higher line voltage. The effectiveness of a condenser is proportional to the second power of the voltage applied to it, and hence it is desirable that the electrostatic type, continuous duty running condenser 15 be subjected to the higher of the two line voltages at all times when the motor is in operation. On the other hand the short time duty electrolytic condenser 14 should not be subjected to more than the lower line voltage even for the short starting period. Hence the invention utilizes both types of condensers to best advantage for the dual voltage service. It will also be noted that while condenser 15 has been referred to as a running condenser, it is also used during starting and adds its phase splitting influence to that of condenser 14 for starting purposes to good advantage. In Figs. 3 and 4 the winding 19 is omitted and only one starting winding coil 20 is used. This arrangement has slightly lower cost than the arrangement of Fig. 1 but the running condenser 15 is not so effectively used since in Fig. 1 the winding 19 of Fig. 1 increases the voltage across condenser 15. Also, in Fig. 1 the running condenser current flows through more coil turns than in Fig. 3. Hence the condenser 15 is much more effectively used in the arrangement of Fig. 1.

It will be understood that the axes of the main and starting windings are displaced by a suitable angle of the order of 90 degrees, that the capacity of condenser 14 will be considerably larger than that for condenser 15, and that the number of turns in a coil in the starting winding axis will preferably be greater than in the number of turns in a coil in the main winding axis to conform to good design practice for this general type of motor.

What I claim as new and desire to secure by Letters Patent of the United States is:

1. A double voltage capacitor motor having a main winding and a starting winding coil having their winding axes displaced at an angle to each other, a secondary rotor for said motor, said main winding comprising three coils two of which are similar, terminal connections for connecting said similar coils so as to be energized in parallel or in series, the third main winding coil being permanently connected as an auto-transformer extension of one of the similar main winding coils, an electrolytic condenser connected in series with the starting winding coil across said similar main winding portion of such auto-transformer, a running condenser connected in series with said starting winding coil across all of such auto-transformer, and a switch responsive to the speed of said motor for opening only the electrolytic condenser circuit as the motor comes up to speed.

2. A double voltage condenser motor having a main winding and a starting winding coil having their winding axes displaced at an angle to each other, a secondary rotor for said motor, said main winding comprising three coils having equal numbers of turns, two of said coils being similar and made of a larger-sized conductor than the third coil, terminals for energizing said similar coils in series or in parallel, said third coil being permanently connected as an auto-transformer extension of one of said similar coils, an electrolytic condenser connected in series with said starting winding coil across the larger conductor portion of such auto-transformer, a running condenser connected in series with said starting winding coil across all of such auto-transformer and an automatic switch responsive to the speed of the motor for opening only the electrolytic condenser circuit after the motor has started.

3. A double voltage capacitor motor having main and starting windings having their axes displaced at an angle to each other, a secondary rotor for said motor, said main winding comprising a pair of similar coils and a third coil permanently connected as an auto-transformer extension to one of said similar coils, the starting winding comprising two coils, an electrolytic condenser connected in series with one coil of the starting winding across said similar main coil portion of such auto-transformer, a running condenser connected in series with both coils of said starting winding across all of such auto-transformer, means for opening only the electrolytic condenser circuit as the motor comes up to speed following a starting operation, and means for energizing the similar coils of said main winding in series or in parallel.

4. A capacitor motor comprising a secondary rotor and main and starting windings having their axes displaced at an angle to each other, said main winding comprising three coils having equal numbers of turns and two coils being similar and wound with larger conductor than the third coil, said third coil being permanently connected as an auto-transformer extension with one of the similar coils, said starting winding comprising two coils with equal numbers of turns but with different sized conductors, an electrolytic condenser connected in series with the larger conductor starting winding coil across the larger conductor main coil portion of such auto-transformer, a running condenser connected in series with both starting winding coils across all of such main winding auto-transformer, and automatic means for opening only the electrolytic condenser circuit as the motor comes up to speed upon being started.

BERNARD M. CAIN.